ent invention by providing granular cyanoethyl starches having a degree of substitution below about 0.06 cyano-

3,689,361
CYANOETHYL STARCH
Edwin L. Speakman, Clinton, Iowa, assignor to Standard Brands Incorporated, New York, N.Y.
No Drawing. Continuation-in-part of application Ser. No. 422,388, Dec. 30, 1964. Division of application Ser. No. 783,393, Dec. 12, 1968. This application Nov. 18, 1970, Ser. No. 90,797
Int. Cl. C12b 1/00
U.S. Cl. 195—31 R                    7 Claims

ABSTRACT OF THE DISCLOSURE

Granular cyanoethyl starches having below about 0.06 cyanoethyl groups per anhydroglucose unit are readily gelatinizable in water at a neutral pH, show less sludge formation on storage than aqueous pastes of untreated starch, have less tendency to retrograde when pasted in water, and are more readily liquefied by alpha-amylase than untreated starch.

---

This application is a continuation-in-part of application Ser. No. 422,388, filed Dec. 30, 1964 now abandoned; and is a divisional of application Ser. No. 783,393 filed Dec. 12, 1968, now abandoned.

This invention relates to cyanoethyl ethers of starch, the preparation thereof, and methods of using the same. In the art, there are many patents which disclose methods of preparing cyanoethyl ethers of starch and the utilization of such starch ethers. U.S. Patent No. 2,316,129 to Bock et al., describes a process for preparing cyanoethyl ethers of starch wherein starch is pasted in a strong alkaline solution and reacted with acrylonitrile until the degree of substitution of the pasted starch is such that the cyanoethyl starch precipitates. The dried cyanoethyl starch products are described as being brittle and insoluble in water. U.S. Patents 2,836,511, 2,836,512 and 2,837,438 to Sample disclose relatively highly substituted cyanoethyl starches i.e., 1.5 to 2.0 cyanoethyl groups per anhydroglucose unit, and methods of dispersing them. Dispersing agents such as a water-ketone mixture, a water-acrylonitrile mixture and dimethyl sulfoxide with and without water are described. Australian Patent No. 214,534, also to Sample, discloses cyanoethyl starches and methods of preparing the same. These cyanoethyl starches are described as having utility as medicinal dusting powders, being resistant to fungal growth, having reduced tendency to deteriorate through attack by microorganisms and being able to withstand a steam sterilization procedure without caking. U.S. Patent No. 2,965,632 to Paschall describes a controlled procedure for gelatinizing highly substituted cyanoethyl starches.

From the disclosures of the patents noted above and from the utility and properties of the cyanoethyl starches described, it would seem apparent that all these patents are directed to cyanoethyl starches having relatively high degrees of substitution. Because of the high degree of substitution of these cyanoethyl starches, it is difficult, if not impossible, to gelatinize them in water at a neutral pH. Moreover, these cyanoethyl starches are not readily converted or liquefied by alpha-amylase.

It is the principal object of the present invention to provide a cyanoethyl starch which will start to gelatinize in water at a neutral pH at a lower temperature than untreated starch. It is a further object of the present invention to provide a cyanoethyl starch which is readily converted or liquefied by alpha-amylase.

These objects are attained in accordance with the present invention by providing granular cyanoethyl starches having a degree of substitution below about 0.06 cyanoethyl group per anhydroglucose unit.

Starch pastes produced by converting or liquefying untreated starch with alpha-amylase are widely used for the coating of paper. Obtaining a final desired paste viscosity presents difficulties. For instance, in commercial practice the operator in a paper mill carries out starch conversions under conditions to obtain a paste viscosity which experience has shown will result in about the desired final paste viscosity, and then inactivates the alpha-amylase by raising the temperature of the conversion mixture. Because of the high temperatures necessary to inactivate the alpha-amylase, a further viscosity decrease occurs. The relatively large differences between the viscosity at the end of the conversion cycle and the viscosity at the end of the inactivation cycle, force the operator to rely solely on experience in carrying out the conversion cycle and thus the desired final paste viscosity is not obtainable with any particular degree of assurance. In many instances, to obtain the desired final paste viscosity, water must be added to the pasted starch after inactivation in order to adjust the final viscosity thereof to the desired level.

The cyanoethyl starches of the present invention are hydrolyzed or liquefied so readily by alpha-amylase that the paste viscosity at the end of conversion is much lower than it is in the case of untreated starch. This results in a smaller change in the viscosity of pastes of the cyanoethyl starches during inactivation of the alpha-amylase, and thus provides the benefit that a substantially predictable final paste viscosity can be more easily obtained. Another advantage of the cyanoethyl starches is that since they are so readily hydrolyzed by alpha-amylase, a paste of predetermined viscosity may be obtained by using less enzyme and/or in less time and thus provides obvious economic benefits.

When an enzyme converted starch paste is allowed to stand undisturbed for a time, a sediment forms and settles out. This sediment, or sludge consists of non-starch residue, i.e., proteinaceous and fatty materials and fibers. The sludge is extremely undesirable since it has a tendency to form lumps which may persist through clay coating operations and appear on the coated paper as spots. When this happens, the section of the paper involved must be cut out and rejected. Pastes of cyanoethyl starches of the present invention, on the other hand, show greatly reduced tendency to form sludge on standing. Since in the paper industry it is the common practice to store converted starch pastes without agitation prior to use, the reduction of sludge formation in pastes of the cyanoethyl starches provides an important advantage to the paper industry.

When untreated raw granular starch is heated and dispersed in water to produce a paste and the paste is allowed to cool and age, retrogradation occurs. Retrogradation involves a shifting of the straight-chain portion of the starch (amylose fraction of the starch) into parallel arranged chains where hydrogen bonding locks together these chains in a permanent network. The physical manifestation of this phenomenon is a thickening of the paste into a gel of fairly great rigidity. Heat and agitation are not effective to destroy this network. Users of starch take great care to prevent or minimize retrogradation since after such occurs the starch paste is no longer dispersed and therefore cannot be used for sizing or coating applications. Pastes of cyanoethyl starches of the present invention show greatly reduced tendency to retrograde on storage and thus have increased viscosity stability.

The cyanoethyl starches of the present invention have a degree of substitution below about 0.06 cyanoethyl group per anhydroglucose unit. Preferably, the cyanoethyl starches have a degree of substitution from about 0.01 to about 0.03 cyanoethyl group per anhydroglucose unit and most preferably have a degree of substitution of about 0.02 cyanoethyl group per anhydroglucose unit. At extremely low degrees of substitution of 0.005, it appears that cyanoethyl starches have essentially the same properties as untreated starch and thus provide no particular benefits.

In preparing the cyanoethyl starches, it is preferred to form an aqueous slurry of starch granules, an alkaline catalyst and acrylonitrile. Relatively low reaction temperatures may be employed. These temperatures should be below that temperature which tends to cause gelatinization of the starch granules. Higher temperatures may be employed when starch gelatinization inhibitors are present in the slurry. In general, temperatures between about 20° and about 55° C. are satisfactory, but higher or lower temperatures may be used depending on the alkalinity of the slurry, the amount of gelatinization inhibitors present and the exact final degree of substitution of the cyanoethyl starch desired. The reaction time and temperature are interdependent; considerable variation in either or both of these is possible while still maintaining non-gelatinizing conditions. For instance, the time required for the reaction to be completed may be shortened by raising the temperature of the reaction mixture. In general, reaction times varying between one-half hour and 6 hours are satisfactory but preferably the reaction conditions are maintained so that the reaction is completed from about 1 to about 3 hours and most preferably in about 2 hours.

The amount of acrylonitrile provided in the slurry may vary over a relatively wide range. However, it is advantageous that the amount of acrylonitrile present is such that it is all dissolved in the slurry. Preferably the acrylonitrile concentration is from about 0.015 to about 0.092 mole per anhydroglucose unit of starch and most preferably about 0.031 mole per anhydroglucose unit. When large amounts of acrylonitrile are used, it is difficult to obtain the cyanoethyl starches of the present invention. The reason for this is that the reaction proceeds so quickly that it is difficult to stop it when the desired degree of substitution is obtained. This difficulty is accentuated when the reaction is carried out on large scale, i.e., plant scale, since the time necessary to neutralize the reaction mixture is quite long—up to 2 hours because of the quantities of reagents involved.

Any of the strongly alkaline materials may be used as the alkaline catalyst, e.g., alkali metal and alkaline earth metal hydroxides, such as sodium hydroxide, lithium hydroxide, potassium hydroxide and calcium hydroxide, or strong organic bases, such as tetraethanol ammonium hydroxide and tetraethyl ammonium hydroxide. Calcium hydroxide is preferred. The preferred alkali concentration is from about 0.02 to about 0.10 mole per anhydroglucose unit.

The invention is applicable to all varieties of raw starch, e.g., corn, tapioca, wheat, waxy sorghum, waxy maize, grain sorghum, rice and the like. Further, the invention is applicable to various modified starches and derivatives of starch, e.g., thin boiling starches, oxidized starches, starch ethers, starch esters and the like. The term "starch," as used in the claims, is intended to include all of the above listed substances.

In order to more clearly disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

Example 1

Hydrated lime was added to 6.0 liters of a slurry of untreated cornstarch containing 35.54 percent dry basis starch at a level of 0.8 percent based on the water in the slurry. Titrating a portion of this slurry with a standard acid solution indicated that there was present 13.8 milliequivalents of alkali per 100 ml. of slurry, or 0.027 mole of calcium hydroxide per anhydroglucose unit. The alkaline slurry was place in a covered vessel set in a water bath maintained at 130° F., and stirred. When the slurry temperature reached 129° F., 1 percent acrylonitrile by weight based on the starch (0.030 mole per AGU) was added to the slurry. After stirring for 20 hours, the slurry was neutralized with muriatic acid, diluted to about 28.4 percent solids and sieved through a No. 20 silk sieve. The product was recovered in granule form by vacuum filtration, the filter cake was puddled, and then was dried in a laboratory model Proctor & Schwartz forced air oven maintained at an air temperature of 160° F. It was noted that the filtration rate of this product was slower than for unmodified cornstarch and the cake was slightly soft to the touch.

The product, having a D.S. of 0.02, was evaluated for convertibility by alpha-amylase by preparing a suspension containing 18 percent dry basis starch and 0.03 percent based on the starch, of Vanzyme 31 (a dry bacterial alpha-amylase preparation) having a potency of about 20,000 liquefons per gram, and heating, with constant mechanical stirring, through the following time-temperature cycle.

| Time, min.: | Temp., ° F. |
|---|---|
| 0 | 70 |
| 10 | 140 |
| 15 | 160 |
| 20 | 160 |
| 25 | 172 |
| 45 | 172 |
| 47 | 205 |
| 62 | 205 |

At the end of the converting portion of the cycle (at 45 minutes) and at the end of the inactivation portion (62 minutes), samples were taken, cooled to 140° F., and the viscosities measured using a Brookfield viscometer at 20 r.p.m. Also, to determine sludge formation, a portion of the final paste was diluted 1 to 3 with hot water and 1000 ml. of the diluted paste was poured into a 1-liter Imhoff cone. This paste was allowed to stand undisturbed for 24 hours, at which time the volume of the sediment or sludge was observed. The data obtained are shown below, together with average data for pastes of untreated cornstarch.

| | Product | Untreated |
|---|---|---|
| Brookfield visc., cps.: | | |
| End of conversion (#2 spindle) | 28 | 1,000–1,300 |
| End of inactivation (#1 spindle) | 24 | 50–80 |
| Sludge volume, ml. | 0.2 | 10–15 |

Example 2

To 6 liters of unmodified cornstarch slurry containing 35.54 percent dry basis starch was added 10 percent anhydrous sodium sulfate and 1 percent sodium hydroxide based on the weight of the water present in the slurry (0.25 molar NaOH based on the water, or 0.073 mole/AGU). The caustic was added as a solution containing 10 g. NaOH and 20 g. $Na_2SO_4$ per 100 ml. of solution. After heating the alkaline slurry to 130° F., 3 percent acrylonitrile by weight based on the dry starch (0.0918 mole/AGU) was added and allowed to react for 30 minutes. Then the caustic was neutralized by addition of muriatic acid to a slurry pH of 6.5. The product was recovered in granule form by filtering on a vacuum filler and thoroughly washed to remove salts, puddled, and dried in a laboratory model Proctor & Schwartz forced air oven maintained at an air temperature of 160° F. The product, which had a D.S. of 0.064, was evaluated as described in Example 1. It showed a Brookfield viscosity of 88 cps. at the end of the conversion cycle and 39 cps. at the end of inactivation, and a sludge volume of 0.7 ml. In addition, the cooled paste had an increased clarity and remained fluid on storage for 24 hours. In contrast, untreated cornstarch under the same converting conditions resulted in a paste having poor clarity which formed a very stiff, sliceable gel when stored for 24 hours.

Example 3

The effect of reaction time was determined in a series of three preparations using the same method given in Example 1. Thus, three reaction slurries were prepared containing 35.54 percent dry basis starch, 0.8 percent hydrated lime based on the water in the slurries, and 1 percent acrylonitrile based on the dry basis starch, with the slurry temperature at 129° F. The acrylonitrile was added after the alkaline slurry temperatures reached 129° F. The reaction with acrylonitrile was allowed to continue for 1, 3 and 20 hours, after which the slurries were neutralized using muriatic acid. The slurries were diluted, sieved, and the products were recovered, in granule form, dried and evaluated as described in Example 1. The evaluation gave the following results.

|  | 1 hour | 3 hours | 20 hours |
|---|---|---|---|
| Brookfield visc., cps.: |  |  |  |
| End of conversion (#2 spindle) | 80 | 50 | 28 |
| End of inactivation (#1 spindle) | 32 | 28 | 24 |
| Sludge, ml | 0.8 | 0.6 | 0.2 |

Example 4

The effect of varying the concentration of acrylonitrile under highly alkaline conditions using an anti-gelatinization agent was determined in this example. A cornstarch slurry containing 35.54 percent by weight dry basis starch was prepared and 10 percent anhydrous sodium sulfate by weight based on the water in the slurry was added and dissolved. Sufficient caustic solution having a concentration of 10 g. of sodium hydroxide and 20 g. of sodium sulfate per 100 ml. of solution was added to the slurry to provide a sodium hydroxide concentration of 1 percent based on the water originally present in the slurry. Quantities of this alkaline slurry, each containing 2472 g. dry basis starch, were placed in each of four vessels sitting in a water bath maintained at 130° F. Agitation was provided for each slurry. When the temperature of the slurries reached 129° F., acrylonitrile was added to give concentrations based on the dry basis starch of 0, 1, 2 and 3 percent by weight. The reaction time was one hour. The slurries were then neutralized by the addition of sulfuric acid diluted 1:3 by volume. The products were recovered in granular form by filtering on a vacuum filter, washed thoroughly to remove salts, and dried at 160° F. Evaluation for convertibility by alpha-amylase and sludge formation, as described in Example 1, gave the following results:

|  | Acrylonitrile, percent | | | |
|---|---|---|---|---|
|  | 0 | 1 | 2 | 3 |
| Brookfield visc., cps.: |  |  |  |  |
| End of conversion (#2 spindle) | 830 | 760 | 90 | 50 |
| End of inactivation (#1 spindle) | 39 | 40 | 47 | 37 |
| Sludge, ml | 6.0 | 1.0 | 0.6 | 0.7 |

The above example shows the pronounced effect on the rate of conversion (as reflected by the viscosities at the end of conversion) of increasing the proportion of acrylonitrile in the slurry. That this reduction in viscosity was not due to decreased dispersion of the granule was indicated by the increased clarity of the cooled converted paste; poor for 0 percent and improving to very good for 3 percent acrylonitrile. The viscosities at the end of inactivation were essentially unchanged over that of the control. The sludge volume decreased sharply even when only 1 percent acrylonitrile was used.

Example 5

Various alkali systems were examined briefly in this experiment to determine which would be most suitable in large scale operations. Three six-liter portions of cornstarch slurry were prepared having a temperature of 130° F. and containing 35.54 percent dry basis starch. 1 percent calcium hydroxide based on the weight of the water in the slurry was added to one slurry. 10 percent anhydrous sodium sulfate and 1 percent sodium hydroxide based on the slurry water (in the form of an aqueous solution containing 10 g. sodium hydroxide and 20 g. of sodium sulfate per 100 ml. of solution) was added to the second slurry, and to the last slurry sufficient sodium hydroxide-sodium chloride solution was added to give a slurry alkalinity of 45 (ml. of 0.1 N NaOH required to neutralize 30 ml. of the slurry). 1 percent acrylonitrile by weight based on the starch was added to each slurry, and the reaction was allowed to proceed for one hour at 130° F. The slurries were then neutralized with muriatic acid, diluted to a suitable density and sieved, and the products recovered in granular form by vacuum filtration. The product made with calcium hydroxide was not washed. The other two products were washed thoroughly to remove the excessive concentrations of salts. All the products were dried in a laboratory model Proctor & Schwartz forced air oven maintained at an air temperature of 165° F.

Evaluation of the products for convertibility by alpha-amylase showed that the lowest viscosity was obtained when calcium hydroxide was used as the alkali catalyst. The results obtained when caustic-sulfate was used were about the same as when caustic-chloride was used. The better convertibility of the calcium hydroxide catalyzed product was probably due to the calcium being present in the product during conversion. On the basis of ease of carrying out the reaction and of the low cost, calcium hydroxide is the preferred alkali catalyst. This material has the added advantage that it serves to activate the enzyme and may be left in the product thus eliminating a washing step.

Example 6

Twenty-four liters of a cornstarch slurry containing 35.54 percent by weight dry basis starch were placed in a reaction tank fitted with an agitator and a constant temperature water bath. While the slurry was being heated to 128° F., 0.85 percent calcium hydroxide by weight based on the water in the slurry was added. Titration of 30 ml. of the slurry with a standard acid solution showed that it contained 4.38 milliequivalents of alkali. When the temperature of the slurry reached 129° F., 1 percent acrylonitrile by weight based on the dry substance starch was added. The reaction was allowed to proceed for two hours, after which the slurry was neutralized by the addition of 375 ml. of 20 Bé. muriatic acid. The slurry was diluted and sieved through a #20 silk screen. The pH was adjusted to 6.3, and the product was filtered on a vacuum filter and dried in a Proctor & Schwartz oven at an air temperature of 180° F. Although some very slight damage was noted to the granular structure of the product, the slurry sieved and filtered very well and the dried cake was not unduly hard. Evaluation of this product showed that it was rapidly converted by alpha-amylase.

Example 7

This example illustrates the preparation of cyanoethyl starches according to Australian Pat. No. 214,534 to Sample and compares these cyanoethyl starches with the cyanoethyl starches of the present invention.

1000 ml. of a 0.5 percent solution of NaOH was quickly added to 277 g. of cornstarch (containing 9.79 percent moisture) and mixed in order to obtain a uniform mixture. The mixture was heated to 95° F., and 250 ml. acrylonitrile was added to the mixture. The temperature of the mixture was maintained at 95° F. during the reaction and after a time of 25 minutes, 250 ml. of a 0.25 molar acetic acid solution was added in order to terminate the reaction. The cyanoethyl starch was recovered by vacuum filtration on a Buchner funnel and the filter cake washed by suspending it in 250 ml. of deionized water.

The cyanoethyl starch was recovered from the suspension by vacuum filtration on a Buchner funnel and the filter cake dried overnight in a laboratory hood at room temperature. Drying of this product was completed in a laboratory model Proctor & Schwartz forced air drier at an air temperature of 160° F. The above procedure was repeated twice but the acrylonitrile and the starch were allowed to react for times of 35 and 55 minutes before the reactions were terminated.

The filtration rate of the cyanoethyl starch prepared at the reaction time of 35 minutes was slower than the product prepared at the reaction time of 25 minutes. The cyanoethyl starch prepared at the reaction time of 55 minutes was extremely difficult to filter and thus was not washed.

The degrees of substitution of these cyanoethyl starches were determined and are shown below:

| Sample | Reaction time (minutes) | Degree of substitution |
|---|---|---|
| 1 | 25 | 0.110 |
| 2 | 35 | 0.175 |
| 3 | 55 | *0.413 |

*The degree of substition of this sample seems too high when compared with the other samples and would indicate that certain of the reaction by-products were retained in the sample.

Two cyanoethyl starch samples were prepared generally in accordance with the previous examples. The degrees of substitution of the cyanoethyl starches were 0.02 and 0.064, respectively.

The cyanoethyl starches prepared according to the teachings of Australian Pat. 214,534 and the two cyanoethyl starches of the present invention were evaluated by means of a Visco-Amylo-Graph manufactured by C. W. Brabender Instruments, Inc. This evaluation was carried out by placing an amount of the starch sample in a beaker and adding sufficient water to obtain a slurry volume of about 480 ml. The pH of the slurry was adjusted to 6.5 and the volume of the slurry brought to 500 ml. The amount of starch product in the slurry was 6.0 percent weight by volume. The slurry was placed in the bowl of the Visco-Amylo-Graph and heated to 50° C. The following time-temperature cycle was started by activating the automatic temperature regulator of the instrument which caused the temperature of the slurry to be increased at the rate of 1.5° C. per minute.

(1) heat from 50° C. to 95° C. (30 minutes)
(2) hold at 95° C. for 30 minutes
(3) cool to 50° C. (automatically controlled rate of 1.5° C. per minute, 30 minutes)
(4) hold at 50° C. for 30 minutes.

During the entire cycle that the slurry is in the bowl, the bowl revolves tending to rotate viscosity sensing probes which are immersed in the slurry. The response of the probes due to changes in viscosity is automatically recorded on a chart which is driven by a clock mechanism. This continually records the viscosity of the slurry and the paste during the cook-cool cycle. The cyanoethyl starches prepared according to Australian Patent No. 214,534 and the cyanoethyl starches prepared according to the present invention were evaluated by the procedure described above. The results of this evaluation are shown below:

| Sample | Degree of substitution | Brabender units, time of— | | | |
|---|---|---|---|---|---|
| | | 30 min. | 60 min. | 90 min. | 120 min. |
| 1 | 0.110 | 20 | 40 | 80 | 80 |
| 2 | 0.175 | 20 | 40 | 40 | 100 |
| 3 | 0.413 | 40 | 60 | 80 | 80 |
| 4 | 0.02 | 415 | 410 | 625 | 640 |
| 5 | 0.064 | 30 | 60 | 100 | 80 |

From the above table it is seen that the higher the degree of substitution of the starch products, the smaller is the viscosity increase. The viscosity increase is a manifestation of the degree that the starch granules swell during the cook-cool cycle. For alpha-amylase to readily hydrolyze starch, the starch granules must be in a swollen state. Samples 1, 2 and 3 would be difficult to enzyme hydrolyze because of the inhibited nature of the granules. Sample 5, although showing only a slightly greater increase in viscosity than samples 1, 2 and 3, can be enzyme hydrolyzed but the sample would require cooking for extended periods. A cyanoethyl starch having this degree of substitution is considered to be of borderline usefulness in enzyme conversion processes. Sample 4 would enzyme hydrolyze very readily.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

I claim:
1. A process for preparing a liquefied starch product comprising reacting in an aqueous medium cyanoethyl starch having a degree of substitution below about 0.06 cyanoethyl groups per anhydroglucose unit with alpha-amylase under starch liquefying conditions.

2. A process for preparing a liquefied starch product as defined in claim 1 wherein said cyanoethyl starch has degree of substitution of from about 0.005 to 0.06 cyanoethyl groups per anhydroglucose unit of starch.

3. A process for preparing a liquefied starch product as defined in claim 2 wherein said cyanoethyl starch has a degree of substitution of about 0.02 cyanoethyl groups per anhydroglucose unit of starch.

4. A process for preparing a liquefied starch product as defined in claim 2, wherein said cyanoethyl starch has a degree of substitution of from about 0.01 to about 0.03 cyanoethyl groups per anhydroglucose unit.

5. A process for preparing a liquefied starch product as defined in claim 1, wherein said cyanoethyl starch is in granular form.

6. A process for preparing a liquefied starch product as defined in claim 2, wherein said cyanoethyl starch is in granular form.

7. A process for preparing a liquefied starch product as defined in claim 4, wherein said cyanoethyl starch is in granular form.

References Cited

UNITED STATES PATENTS 3,150,993  9/1964  Hanson et al. _____ 195—31
3,387,998  6/1968  Powers _____ 117—156

A. LOUIS MONACELL, Primary Examiner

G. M. NATH, Assistant Examiner

U.S. Cl. X.R.

117—156